US012752727B2

(12) United States Patent
Park et al.

(10) Patent No.: US 12,752,727 B2
(45) Date of Patent: Oct. 6, 2026

(54) VEHICLE FRONT STRUCTURE

(71) Applicants: Hyundai Motor Company, Seoul (KR); Kia Corporation, Seoul (KR)

(72) Inventors: Ji Woong Park, Hwaseong-si (KR); Chul Hyun Choi, Seoul (KR); Kang San Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 242 days.

(21) Appl. No.: 18/600,224

(22) Filed: Mar. 8, 2024

(65) Prior Publication Data

US 2024/0399988 A1 Dec. 5, 2024

(30) Foreign Application Priority Data

May 31, 2023 (KR) ........................ 10-2023-0070283

(51) Int. Cl.

*B60R 19/18* (2006.01)
*B60R 19/34* (2006.01)
*B62D 21/15* (2006.01)
*B60R 21/00* (2006.01)

(52) U.S. Cl.

CPC .............. *B60R 19/18* (2013.01); *B60R 19/34* (2013.01); *B62D 21/152* (2013.01); *B60R 2021/0023* (2013.01)

(58) Field of Classification Search

CPC ......... B60R 19/18; B60R 19/34; B60R 25/08; B60R 25/085; B60R 2021/0023; B60R 21/152

USPC ........................ 293/133, 102, 149, 150, 154; 296/187.09, 187.1

See application file for complete search history.

(56) References Cited

U.S. PATENT DOCUMENTS

| | | | | |
|---|---|---|---|---|
| 9,010,845 | B1 * | 4/2015 | Ramoutar | B60R 19/14 296/187.1 |
| 9,156,418 | B2 * | 10/2015 | Ramoutar | B60R 19/24 |
| 9,422,007 | B2 | 8/2016 | Suzuki et al. | |
| 9,446,724 | B2 | 9/2016 | Hashimoto et al. | |
| 9,650,075 | B2 | 5/2017 | Murayama | |
| 9,669,785 | B2 * | 6/2017 | Holmstrom | B60R 19/023 |
| 9,676,416 | B2 * | 6/2017 | Kitakata | B62D 21/152 |
| 11,292,523 | B2 * | 4/2022 | Shah | B62D 21/152 |
| 11,396,331 | B2 * | 7/2022 | Park | B62D 21/152 |
| 2014/0159420 | A1 * | 6/2014 | Hashimoto | B62D 21/152 296/187.1 |
| 2014/0361560 | A1 * | 12/2014 | Sakakibara | B62D 21/152 293/133 |
| 2021/0237801 | A1 | 8/2021 | Atsumi et al. | |

(Continued)

FOREIGN PATENT DOCUMENTS

| | | |
|---|---|---|
| JP | H1178731 A | 3/1999 |
| JP | 2007131150 A | 5/2007 |
| JP | 2008284923 A | 11/2008 |

(Continued)

*Primary Examiner* — Roger L Pang

(74) *Attorney, Agent, or Firm* — Slater Matsil, LLP

(57) ABSTRACT

In an embodiment, a vehicle front structure includes a front side member, a front bumper beam located in front of the front side member, a bumper beam extension portion extending from an end of the front bumper beam, a deflector mounted on the bumper beam extension portion, and a support located behind the deflector, wherein the support is attached to an outboard surface of the front side member.

20 Claims, 9 Drawing Sheets

(56) References Cited

U.S. PATENT DOCUMENTS

2021/0276620 A1 9/2021 Kita et al.

FOREIGN PATENT DOCUMENTS

| | | | |
|---|---|---|---|
| JP | 2012153260 | A | 8/2012 |
| JP | 2012153263 | A | 8/2012 |
| KR | 100633912 | B1 | 10/2006 |

* cited by examiner

VEHICLE FRONT STRUCTURE

CROSS-REFERENCE TO RELATED APPLICATIONS

This application claims the benefit of Korean Patent Application No. 10-2023-0070283, filed on May 31, 2023, which application is hereby incorporated herein by reference.

TECHNICAL FIELD

The present disclosure relates to a vehicle front structure.

BACKGROUND

Vehicle crash tests are performed to evaluate crashworthiness through various tests such as frontal impact tests, side impact tests, rear impact tests, and roll-over tests. Recently, small overlap crash tests (simulations of small overlap frontal crashes against a rigid barrier) have been introduced by the Insurance Institute for Highway Safety (IIHS). Such small overlap crash tests are conducted by allowing a small portion (25% of the vehicle width in front of the driver seat) of the vehicle running at 40 mph (64 kph) to strike the barrier, known as the most severe one of the known crash tests.

Eco-friendly motor vehicles such as battery electric vehicles (BEVs), fuel cell electric vehicles (FCEVs), and hybrid electric vehicles (HEVs) include an energy source such as batteries and fuel cells of which the weight is relatively increased compared to that of an energy source of internal combustion engine vehicles, and thus the overall weight thereof may be relatively increased.

As the weight of the eco-friendly motor vehicle is increased due to the increased weight of the energy source compared to the weight of the internal combustion engine vehicle, the increased weight leads to increased impact energy. Accordingly, stiffness/strength of a vehicle body reinforcing structure should be improved, which may cause increases in manufacturing cost and weight of the vehicle. In addition, when the vehicle collides with the barrier in a small overlap crash test, yaw motion of the vehicle may occur, and as a front pillar adjacent to a front door opening of the vehicle directly collides with the barrier, a front pillar reinforcement system should be necessarily improved, which may cause increases in manufacturing cost and weight of the front pillar.

To prevent the yaw motion of the vehicle in a small overlap crash, the existing eco-friendly motor vehicle may have a support attached to each front side member, and the support may be inclined from each end portion of a bumper to the corresponding front side member. During the small overlap crash, as the end portion of the bumper is deformed toward the front side member, the end portion of the bumper may be supported by the support. However, as the deformed end portion of the bumper directly strikes the support during the small overlap crash, the front side member may be excessively bent. Thus, lateral force and lateral displacement of the vehicle may be reduced.

In addition, the existing eco-friendly motor vehicle may be designed to have the end portion of the bumper and the support always be in contact or have a very small distance between the end portion of the bumper and the support, so it may be easily damaged in the event of the small overlap crash (low-speed impact).

The above information described in this background section is provided to assist in understanding the background of the present disclosure, and may include any technical concept which is not considered as prior art that is already publicly known.

SUMMARY

The present disclosure relates to a vehicle front structure, and more particularly, to a vehicle front structure designed to increase lateral displacement of the vehicle in the event of vehicle collisions. An embodiment of the present disclosure can solve the above-mentioned problems occurring in the prior art while advantages achieved by the prior art can be maintained intact.

An embodiment of the present disclosure provides a vehicle front structure designed to suppress yaw motion of the vehicle and increase lateral displacement of the vehicle in the event of small overlap crashes, thereby improving passenger safety.

According to an embodiment of the present disclosure, a vehicle front structure may include a pair of front side members, a front bumper beam located in front of the pair of front side members, a pair of bumper beam extension portions extending from both ends of the front bumper beam toward the exterior of the vehicle, respectively, a pair of deflectors mounted on free ends of the pair of bumper beam extension portions, respectively, and a pair of supports located behind the pair of deflectors, respectively. Each support may be attached to an outboard surface of the corresponding front side member.

Each deflector may include a first deflector member disposed outside the corresponding bumper beam extension portion, and a second deflector member inserted into a cavity of the corresponding bumper beam extension portion, and the first deflector member and the second deflector member may be fixed to the corresponding bumper beam extension portion.

The first deflector member may include a plurality of ribs provided therein, and a plurality of cavities defined by the plurality of ribs.

The second deflector member may include a plurality of ribs provided therein, and a plurality of cavities defined by the plurality of ribs.

The second deflector member may include an insert portion which is inserted into the cavity of the corresponding bumper beam extension portion, and a protruding portion which protrudes from the cavity of the corresponding bumper beam extension portion.

A width of a front end of each support may be less than a width of a rear end of the support.

Each support may include a plurality of ribs provided therein, and a plurality of cavities defined by the plurality of ribs.

The vehicle front structure may further include a frunk bar connecting the pair of front side members in a width direction of the vehicle. Each end of the frunk bar may be fixed to an inboard surface of the corresponding front side member through a bracket.

At least a portion of each support may be aligned with the frunk bar in the width direction of the vehicle.

The vehicle front structure may further include a front subframe having a pair of front mounts mounted on the pair of front side members, respectively. Each front mount may be aligned with at least a portion of the corresponding support and the frunk bar.

Each support may include a rear flange extending toward the rear of the vehicle, and the rear flange of each support may be attached to the outboard surface of the corresponding front side member.

The bracket may include a rear flange extending toward the rear of the vehicle, and the rear flange of the bracket may be attached to the inboard surface of the corresponding front side member.

The rear flange of the support may be aligned with the rear flange of the bracket in the width direction of the vehicle.

The vehicle front structure may further include a pipe extending through the rear flange of the support, a portion of the corresponding front side member, and the rear flange of the bracket.

The front bumper beam may be connected to front ends of the pair of front side members through a pair of crush boxes. A width of each crush box may be greater than a width of the corresponding front side member, and each support may be mounted on the outboard surface of the corresponding front side member behind each crush box.

Each front side member may include a plate provided on the front end thereof, and each crush box may be fixed to the plate of the corresponding front side member.

The plate may have an inboard flange contacting the inboard surface of the corresponding front side member, and an outboard flange contacting the corresponding support.

Each support may include a first attachment wall attached to the plate of the corresponding front side member, a second attachment wall attached to the outboard surface of the corresponding front side member, a first inclined wall facing the corresponding deflector, and a second inclined wall located in front of the first inclined wall.

Each support may further include a third inclined wall facing the rear of the vehicle, and the third inclined wall may intersect the first inclined wall at a predetermined angle.

BRIEF DESCRIPTION OF THE DRAWINGS

The above and other features and advantages of an embodiment of the present disclosure can be more apparent from the following detailed description taken in conjunction with the accompanying drawings.

DETAILED DESCRIPTION OF ILLUSTRATIVE EMBODIMENTS

Figure 1:
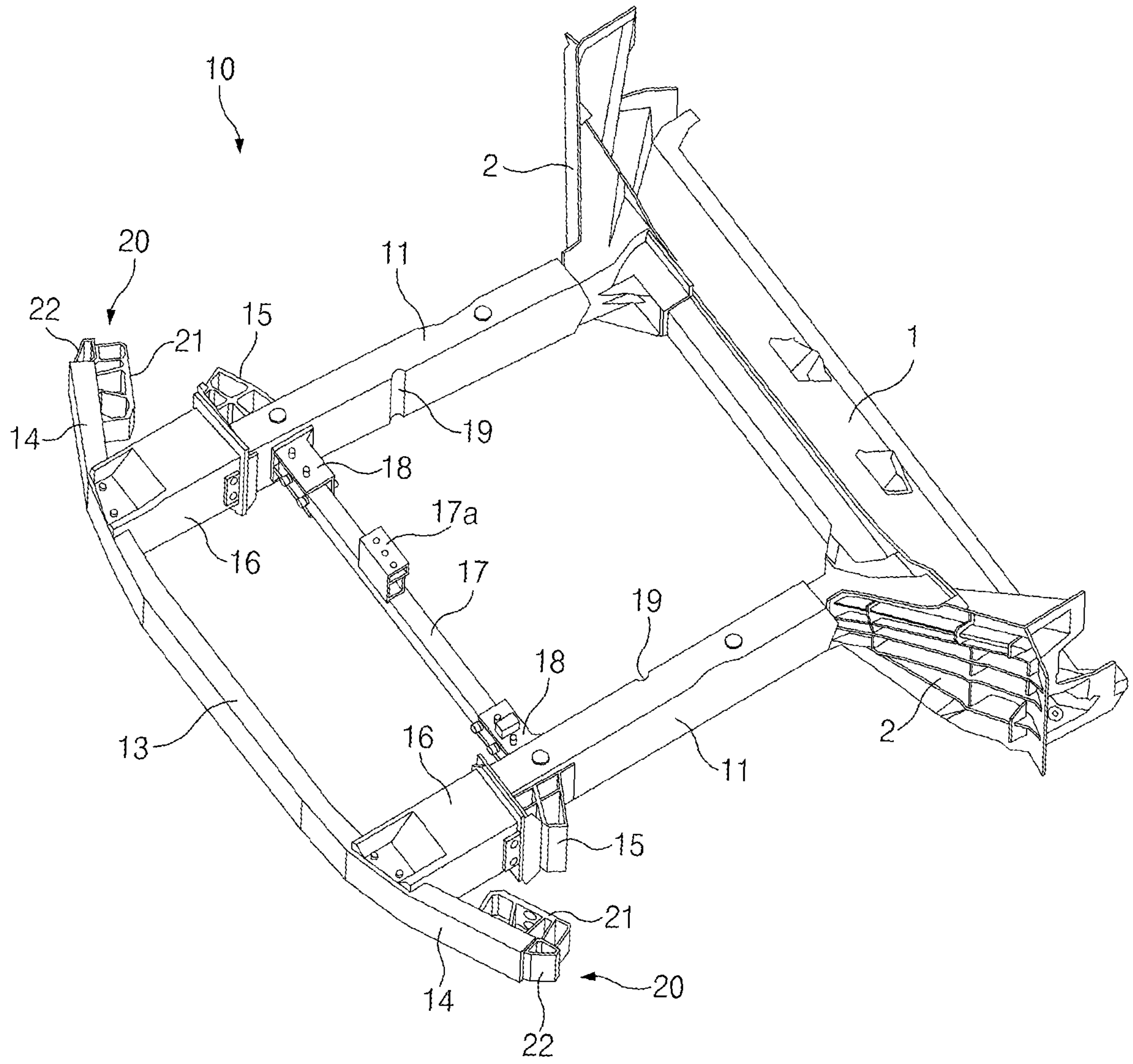
FIG. 1 illustrates a perspective view of a vehicle front structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure can be omitted in order not to unnecessarily obscure the gist of the present disclosure.

Terms such as “first”, “second”, “A”, “B”, “(a)”, and “(b)” may be used to describe elements in exemplary embodiments of the present disclosure. These terms can be only used to distinguish one element from another element, and the intrinsic features, sequence or order, and the like of the corresponding elements are not necessarily limited by the terms. Unless otherwise defined, all terms used herein, including technical or scientific terms, can have the same meanings as those generally understood by those with ordinary knowledge in the field of art to which the present disclosure pertains. Such terms as those defined in a generally-used dictionary can be interpreted as having meanings equal to the contextual meanings in the relevant field of art.

Referring to FIGS. 1 to 5, a vehicle front structure 10 according to an exemplary embodiment of the present disclosure may include a pair of front side members 11, a front bumper beam 13 located in front of the pair of front side members 11, a pair of bumper beam extension portions 14 extending from both ends of the front bumper beam 13 toward the exterior of the vehicle, respectively, a pair of deflectors 20 mounted on the pair of bumper beam extension portions 14, respectively, and a pair of supports 15 located behind the pair of deflectors 20.

The pair of front side members 11 may extend from a dash crossmember 1 toward the front of the vehicle, and a pair of rear lower members 2 may be provided on both ends of the dash crossmember 1, respectively. A rear end of each front side member 11 may be connected to the corresponding rear lower member 2. Each front side member 11 may extend along a longitudinal direction of the vehicle, and a longitudinal axis of the front side member 11 may be parallel to a longitudinal axis of the vehicle. The pair of front side members 11 may be spaced apart from each other in a width direction of the vehicle. Each front side member 11 may include an outboard surface facing the exterior of the vehicle, and an inboard surface facing the interior of the vehicle.

Figure 2:
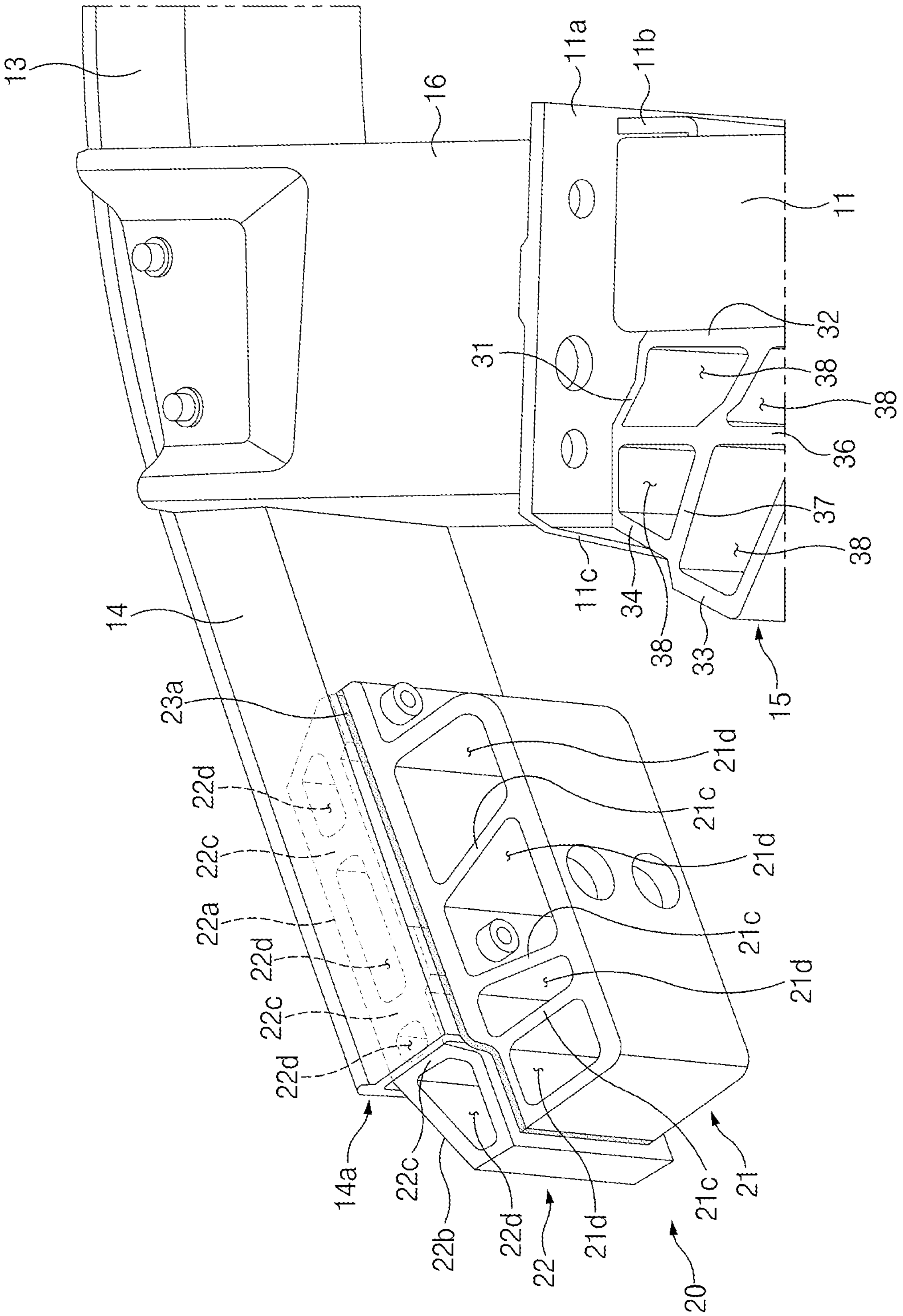
FIG. 2 illustrates an enlarged view of a bumper beam extension portion, a deflector, and a support of a vehicle front structure according to an exemplary embodiment of the present disclosure.
Figure 3:
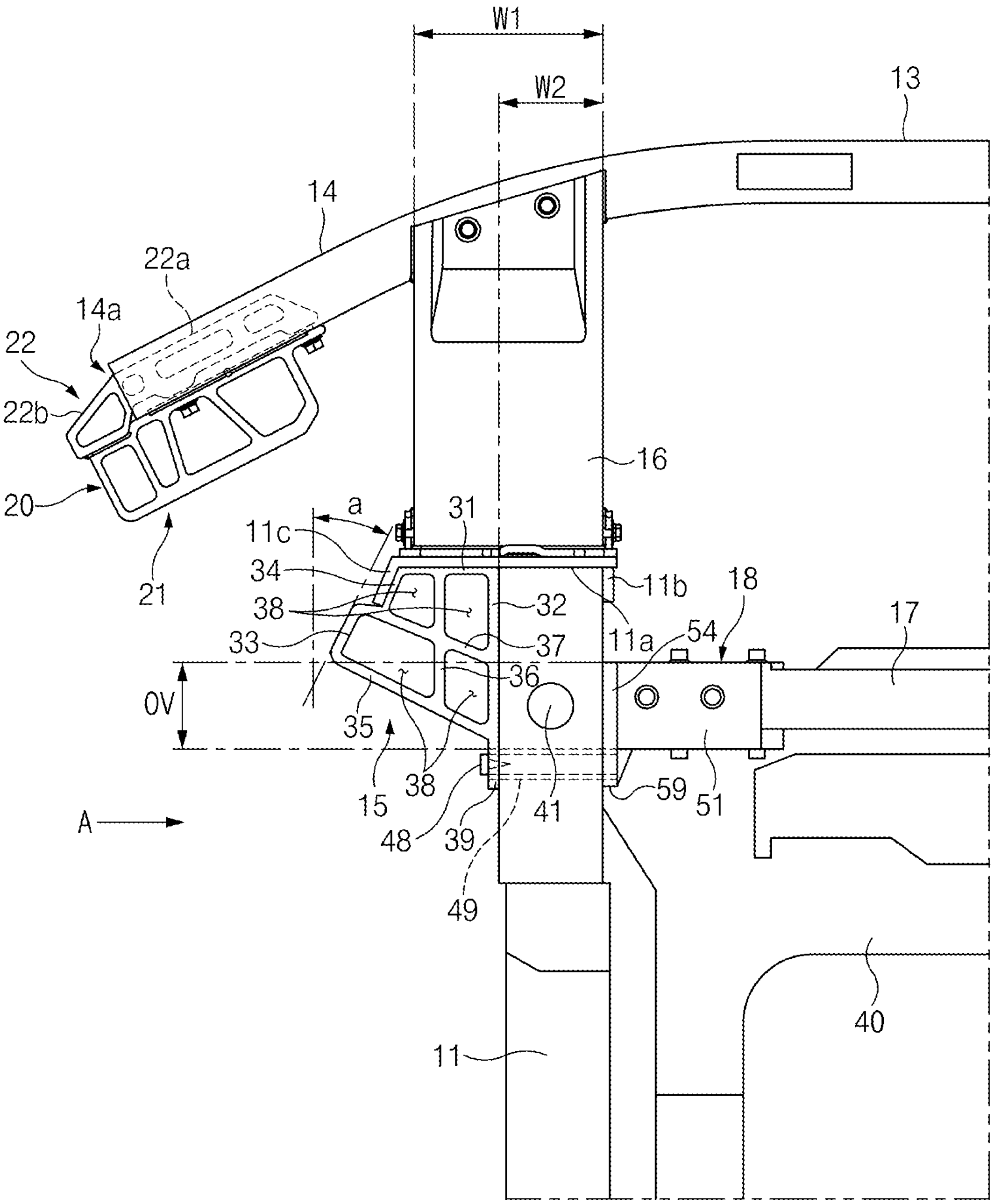
FIG. 3 illustrates a plan view of a portion of a vehicle front structure according to an exemplary embodiment of the present disclosure.

Referring to FIGS. 2 and 3, the front side member 11 may include a plate 11*a* provided on a front end thereof, and the plate 11*a* may be fixed to the front end of the front side member 11 using welding, fasteners, and/or the like. The plate 11*a* may have an inboard flange 11*b* contacting the inboard surface of the front side member 11, and an outboard flange 11*c* contacting the support 15. The inboard flange 11*b* may be parallel to the longitudinal axis of the front side member 11, and the outboard flange 11*c* may be inclined with respect to the longitudinal axis of the front side member 11 at a predetermined or selected angle.

A front bumper assembly may be connected to the front ends of the pair of front side members 11. The front bumper assembly may include a bumper cover (not shown), and the front bumper beam 13 connected to the bumper cover. The front bumper beam 13 may extend along the width direction of the vehicle, and accordingly a longitudinal axis of the front bumper beam 13 may be perpendicular to the longitudinal axis of the front side member 11. The front bumper beam 13 may have a cavity defined therein.

The front bumper beam 13 may be connected to the front ends of the pair of front side members 11 via a pair of crush boxes 16. A front end of each crush box 16 may be fixed to the front bumper beam 13 using welding, fasteners, and/or the like. A rear end of each crush box 16 may be fixed to the plate 11*a* of the corresponding front side member 11 using welding, fasteners, and/or the like. In particular, each crush box 16 may be aligned with the corresponding front side member 11 in the longitudinal direction of the vehicle, and accordingly each crush box 16 and the corresponding front side member 11 may extend from the front bumper beam 13 toward the rear of the vehicle along the longitudinal direction of the vehicle. Each crush box 16 may include an outboard surface facing the exterior of the vehicle, and an inboard surface facing the interior of the vehicle.

Referring to FIG. 3, a width w1 of each crush box 16 may be greater than a width w2 of the corresponding front side member 11, and the outboard surface of the front side member 11 may be further recessed toward a central longitudinal axis of the vehicle than the outboard surface of the crush box 16. Each support 15 may be attached to the outboard surface of the corresponding front side member 11, and the support 15 may be located behind the corresponding crush box 16. A front end of the support 15 may be adjacent to the rear end of the corresponding crush box 16.

Each bumper beam extension portion 14 may extend from each end of the front bumper beam 13 toward the exterior of the vehicle, and the bumper beam extension portion 14 may be curved toward the rear of the vehicle. In particular, each bumper beam extension portion 14 may be curved toward the rear of the vehicle so that it may face the corresponding front side member 11 and/or the corresponding support 15. During a small overlap crash, when a barrier 70 (see FIG. 4) strikes the bumper beam extension portion 14, the bumper beam extension portion 14 may be deformed toward the crush box 16 and the front side member 11.

Each bumper beam extension portion 14 may include a top wall facing the top of the vehicle, a bottom wall facing the bottom of the vehicle, a front wall facing the front of the vehicle, and a rear wall facing the rear of the vehicle. The bumper beam extension portion 14 may have a cavity defined therein, and the cavity may be defined by the top wall, bottom wall, front wall, and rear wall of the bumper beam extension portion 14.

Figure 4:
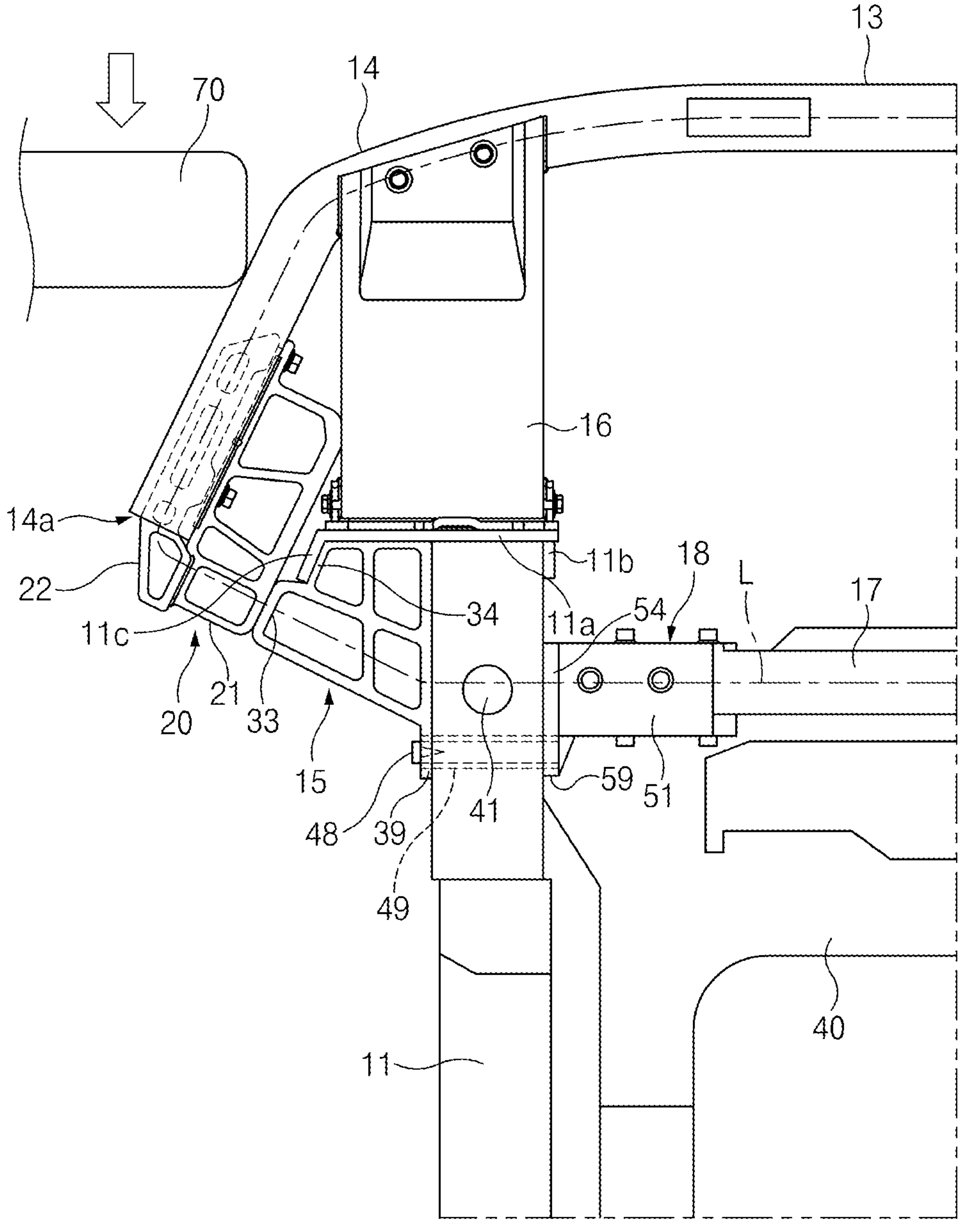
FIG. 4 illustrates a state in which a barrier strikes a vehicle front structure according to an exemplary embodiment of the present disclosure in a small overlap crash.

Referring to FIGS. 3 and 4, each deflector 20 may be mounted on a free end 14*a* of the bumper beam extension portion 14 through a mechanical coupling mechanism, a thermal coupling mechanism, and/or the like. Referring to FIG. 4, when the bumper beam extension portion 14 is deformed toward the crush box 16 and the front side member 11, the deflector 20 may come into contact with the support 15 or may strike the support 15.

Referring to FIG. 2, the deflector 20 may include a first deflector member 21 located outside the bumper beam extension portion 14, and a second deflector member 22 inserted partially into the cavity of the bumper beam extension portion 14. The first deflector member 21 and the second deflector member 22 may be fixed to the rear wall of the bumper beam extension portion 14 using fasteners, welding, thermal fusion, and/or the like.

The first deflector member 21 may be fixed to the rear wall of the bumper beam extension portion 14 so that the first deflector member 21 may be exposed to the support 15 outside the bumper beam extension portion 14. The first deflector member 21 may have a plurality of ribs 21*c* provided therein, and a plurality of cavities 21*d* defined by the plurality of ribs 21*c*. The first deflector member 21 may have a constant cross section along a longitudinal direction thereof. Strength and stiffness of the first deflector member 21 may be improved by the plurality of ribs 21*c*, and the weight of the first deflector member 21 may be reduced due to the plurality of cavities 21*d*. According to an exemplary embodiment, the first deflector member 21 may be manufactured by extruding, casting, or pressing.

The second deflector member 22 may have an insert portion 22*a* which is inserted into the cavity of the bumper beam extension portion 14, and a protruding portion 22*b* which protrudes from the cavity of the bumper beam extension portion 14. The second deflector member 22 may have a plurality of ribs 22*c* provided therein, and a plurality of cavities 22*d* defined by the plurality of ribs 22*c*. The second deflector member 22 may have a constant cross section along a longitudinal direction thereof. Strength and stiffness of the second deflector member 22 may be improved by the plurality of ribs 22*c*, and the weight of the second deflector member 22 may be reduced due to the plurality of cavities 22*d*. According to an exemplary embodiment, the second deflector member 22 may be manufactured by extruding, casting, or pressing.

The insert portion 22*a* of the second deflector member 22 may be inserted into the cavity of the bumper beam extension portion 14, and the first deflector member 21 may be mounted on the rear wall of the bumper beam extension portion 14 in an exposed manner so that the deflector 20 may be firmly fixed to the free end of the bumper beam extension portion 14, and the deflector 20 and the bumper beam extension portion 14 may be easily assembled.

Referring to FIG. 2, edges of the first deflector member 21 may be fixed to the rear wall of the bumper beam extension portion 14 through all-around-welding 23*a*, such as metal inert gas (MIG) welding.

Each support 15 may be sufficiently spaced apart from the corresponding deflector 20 in a diagonal direction, and the support 15 may be fixed to the outboard surface of the corresponding front side member 11 using fasteners, welding, and/or the like. Referring to FIGS. 2 and 3, each support 15 may include a first attachment wall 31 attached to the plate 11*a* of the corresponding front side member 11, a second attachment wall 32 attached to the outboard surface of the corresponding front side member 11, a first inclined wall 33 facing the corresponding deflector 20, a second inclined wall 34 located in front of the first inclined wall 33, and a third inclined wall 35 facing toward the rear of the vehicle.

The first attachment wall 31 may be attached to the plate 11*a* of the front side member 11 using fasteners, welding, and/or the like. According to an exemplary embodiment, the first attachment wall 31 may be fixed to the plate 11*a* of the front side member 11 using a flow drill screw (FDS).

The second attachment wall 32 may be attached to the outboard surface of the front side member 11 using fasteners, welding, and/or the like. According to an exemplary embodiment, edges of the second attachment wall 32 may be fixed to the outboard surface of the front side member 11 using MIG welding.

As shown in FIG. 3, the first inclined wall 33 may be inclined with respect to the longitudinal axis of the vehicle at a predetermined or selected angle a. The angle a of inclination of the first inclined wall 33 may be an acute angle.

The second inclined wall 34 may be inclined with respect to the longitudinal axis of the front side member 11 at an angle which is the same as or similar to the angle of inclination of the first inclined wall 33. The second inclined wall 34 may be offset with respect to the first inclined wall 33 by a predetermined or selected distance, and the outboard flange 11*c* of the plate 11*a* may be inclined at an angle which is the same as the angle of inclination of the second inclined wall 34. The outboard flange 11*c* of the plate 11*a* may be fixed to the second inclined wall 34 using fasteners, welding, and/or the like. According to an exemplary embodiment, the outboard flange 11*c* of the plate 11*a* may be fixed to the second inclined wall 34 using FDS.

The third inclined wall 35 may be inclined with respect to the longitudinal axis of the vehicle at a predetermined or selected angle, and the third inclined wall 35 may intersect the first inclined wall 33 at a predetermined or selected angle.

A width of the front end of the support 15 may be less than a width of a rear end of the support 15 due to the first inclined wall 33 and the second inclined wall 34. During a small overlap crash (see e.g., FIG. 4), when the bumper beam extension portion 14 is bent toward the front side member 11, the deflector 20 may directly come into contact with or strike the first inclined wall 33 of the support 15 and/or the outboard flange 11*c* of the plate 11*a*, and a contact area of the deflector 20 with the first inclined wall 33 of the support 15 and the outboard flange 11*c* of the plate 11*a* may be relatively large so that a lateral force applied to the vehicle may increase, and thus lateral displacement of the vehicle may increase.

The support 15 may have a relatively small size allowing the first attachment wall 31 of the support 15 to be mounted on the plate 11*a* of the front side member 11. Accordingly, when the first deflector member 21 of the deflector 20 strikes the support 15 at the beginning of the small overlap crash, bending of the front side member 11 may be minimized, and the lateral displacement of the vehicle may relatively increase.

Referring to FIGS. 2 and 3, the support 15 may include a plurality of ribs 36 and 37 provided therein, and a plurality of cavities 38 defined by the plurality of ribs 36 and 37. The plurality of ribs 36 and 37 may include a first rib 36 extending in the longitudinal direction of the vehicle, and a second rib 37 intersecting at a predetermined or selected angle with respect to a longitudinal axis of the first rib 36. The first rib 36 may connect the first attachment wall 31 and the third inclined wall 35, and the second rib 37 may connect the first inclined wall 33 and the second attachment wall 32. The longitudinal axis of the first rib 36 may be parallel to the longitudinal axis of the front side member 11. A longitudinal axis of the second rib 37 may be substantially parallel to a longitudinal axis of the third inclined wall 35.

The support 15 may have a constant cross section along a longitudinal direction thereof. According to an exemplary embodiment, the support 15 may be manufactured by extruding, casting, or pressing.

Referring back to FIG. 1, the vehicle front structure 10 according to an exemplary embodiment of the present disclosure may further include a frunk bar 17 which can be a kind of crossmember connecting the pair of front side members 11 in the width direction of the vehicle. The frunk bar 17 may be configured to support a frunk housing (not shown) mounted in a front compartment of an electric vehicle. The frunk bar 17 may have a protrusion 17*a* protruding upwardly. The frunk bar 17 may extend along the width direction of the vehicle, and both ends of the frunk bar 17 may be fixed to the pair of front side members 11 through a pair of brackets 18, respectively. Each front side member 11 may include the bracket 18 fixing the end portion of the frunk bar 17, and the bracket 18 may be fixed to the inboard surface of the front side member 11.

Referring to FIG. 1, the front side member 11 may have a recessed bead 19 located behind the bracket 18. The recessed bead 19 may be provided in the inboard surface of the front side member 11 and extend in a height direction of the inboard surface of the front side member 11. The recessed bead 19 may be spaced apart from the bracket 18 by a relatively large distance.

Figure 7:
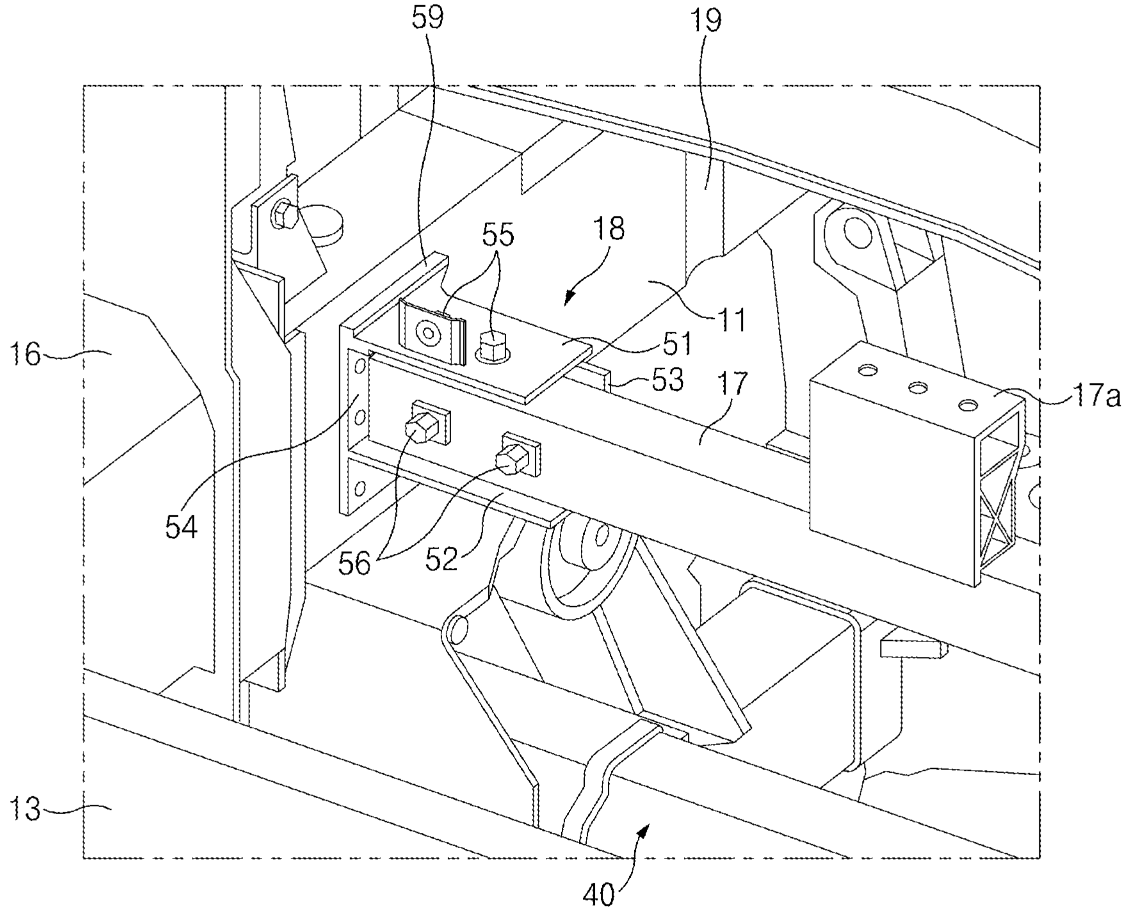
FIG. 7 illustrates a state in which a frunk bar is fixed to a bracket of a front side member in a vehicle front structure according to an exemplary embodiment of the present disclosure, which is viewed from the front of the vehicle.
Figure 8:
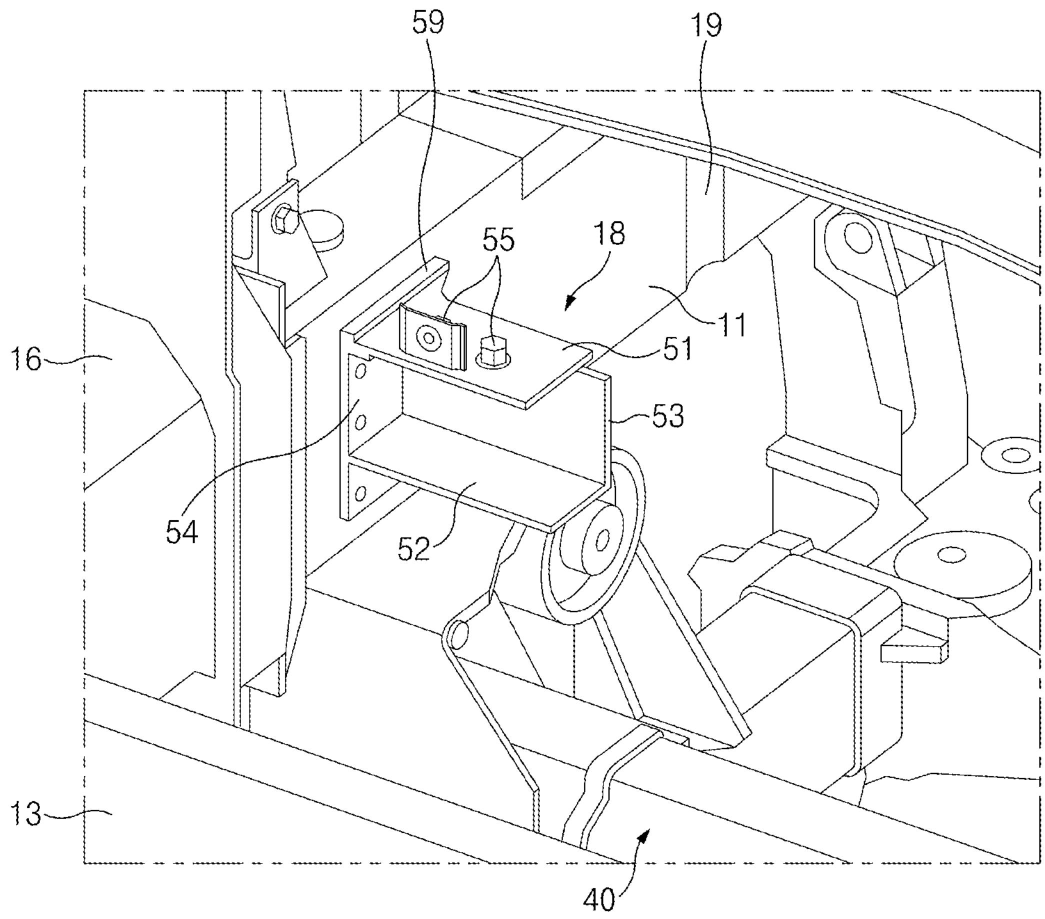
FIG. 8 illustrates a bracket of a front side member in a vehicle front structure according to an exemplary embodiment of the present disclosure.
Figure 9:
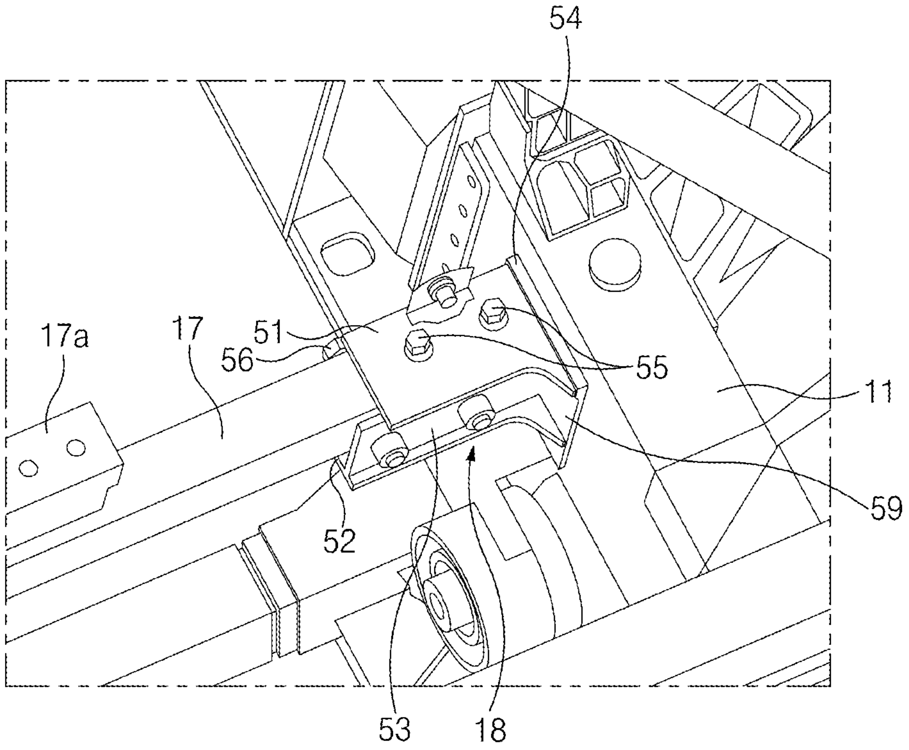
FIG. 9 illustrates a state in which a frunk bar is fixed to a bracket of a front side member in a vehicle front structure according to an exemplary embodiment of the present disclosure, which is viewed from the rear of the vehicle.

Referring to FIGS. 7 to 9, the bracket 18 may include a top wall 51 facing the top of the vehicle, a bottom wall 52 facing the bottom of the vehicle, a rear wall 53 facing the rear of the vehicle, and a side wall 54 attached to the inboard surface of the front side member 11. The rear wall 53 may vertically connect the top wall 51 and the bottom wall 52, and the bracket 18 may be closed by the rear wall 53 with respect to the rear of the vehicle, and the bracket 18 may be open to the front of the vehicle.

Each end portion of the frunk bar 17 may be fixed to the top wall 51, the bottom wall 52, and the rear wall 53 of the bracket 18 through a plurality of fasteners 55 and 56. The plurality of first fasteners 55 may fasten the top wall 51, the end portion of the frunk bar 17, and the bottom wall 52, and each first fastener 55 may extend along a height direction of the vehicle. The plurality of second fasteners 56 may fasten the end portion of the frunk bar 17 and the rear wall 53, and each second fastener 56 may extend along the longitudinal direction of the vehicle. Since the bracket 18 is open to the front of the vehicle, the end portion of the frunk bar 17 may be easily mounted to the bracket 18, and the frunk bar 17 may be supported by the rear wall 53 of the bracket 18 so that the frunk bar 17 may be stably supported to the bracket 18 in the event of a frontal collision of the vehicle.

Referring back to FIG. 3, at least a portion of the support 15 may be aligned with a portion of the front side member 11, the bracket 18, and the frunk bar 17 in the width direction of the vehicle so that a portion of the support 15, a portion of the front side member 11, the bracket 18, and the frunk bar 17 may overlap each other. An overlap area OV between the portion of the support 15, the portion of the front side member 11, the bracket 18, and the frunk bar 17 may extend along a longitudinal direction of the front side member 11. The support 15, the front side member 11, the bracket 18, and the frunk bar 17 may be connected to each other through the overlap area OV so that the support 15, the front side member 11, and the frunk bar 17 may form a load path transferring a lateral force, and thus lateral displacement of the vehicle may increase during a small overlap crash. In particular, the lateral force may be transferred to the front side member 11 and the frunk bar 17 through the third inclined wall 35 of the support 15 so that the lateral displacement of the vehicle may increase.

Referring to FIG. 3, the support 15 may further include a rear flange 39 extending from the second attachment wall 32 toward the rear of the vehicle. The rear flange 39 of the support 15 may be attached to the outboard surface of the front side member 11 using fasteners, welding, and/or the like. The bracket 18 may further include a rear flange 59 extending from the side wall 54 toward the rear of the vehicle. The rear flange 59 of the bracket 18 may be attached to the inboard surface of the front side member 11 using fasteners, welding, and/or the like. The rear flange 39 of the support 15 may be aligned with the rear flange 59 of the bracket 18 along the width direction of the vehicle, and accordingly a portion of the front side member 11 may be sandwiched between the rear flange 39 of the support 15 and the rear flange 59 of the bracket 18.

Referring to FIG. 3, a pipe 49 may extend through the rear flange 39 of the support 15, the front side member 11, and the rear flange 59 of the bracket 18. The pipe 49 may extend along a width direction of the front side member 11. A first end portion of the pipe 49 may be fixed to the rear flange 39 of the support 15 by welding and/or the like, and a second end portion of the pipe 49 may be fixed to the rear flange 59 of the bracket 18 by welding and/or the like. Thus, the support 15 and the bracket 18 may be firmly fixed to both side surfaces of the corresponding front side member 11 through the pipe 49. According to an exemplary embodiment, the edges of the second attachment wall 32 and the rear flange 39 of the support 15 may be fixed to the outboard surface of the front side member 11 using MIG welding, and the rear flange 39 of the support 15 may be fixed to the outboard surface of the front side member 11 using various fasteners 48, such as FDS.

Before the occurrence of a crash, as illustrated in FIG. 3, the deflector 20 may be sufficiently spaced apart from the support 15 in the diagonal direction. When the bumper beam extension portion 14 is bent during a crash, as illustrated in FIG. 4, the deflector 20 may be moved by a spaced distance between the deflector 20 and the support 15, and then strike or come into contact with the support 15, and thus sufficient low-speed crashworthiness of the vehicle may be achieved.

Referring to FIG. 4, during a small overlap crash, a barrier 70 may strike the bumper beam extension portion 14 so that the bumper beam extension portion 14 may be bent toward the support 15, and the deflector 20 may come into contact with the first inclined wall 33 of the support 15 and/or the outboard flange 11*c* of the plate 11*a*. Accordingly, the front bumper beam 13, the bumper beam extension portion 14, the deflector 20, the support 15, the front side member 11, and the frunk bar 17 may form a load path L, transferring a load laterally, and the lateral displacement of the vehicle may be effectively induced at the beginning of the small overlap crash. In particular, in the small overlap crash test, the lateral force generated when the bumper beam extension portion 14 collides with the barrier 70 may be transferred through the bumper beam extension portion 14, the support 15, and the frunk bar 17 in the width direction of the vehicle, and thus a yaw rotation of the vehicle may be suppressed while the lateral displacement of the vehicle may be increased.

Figure 5:
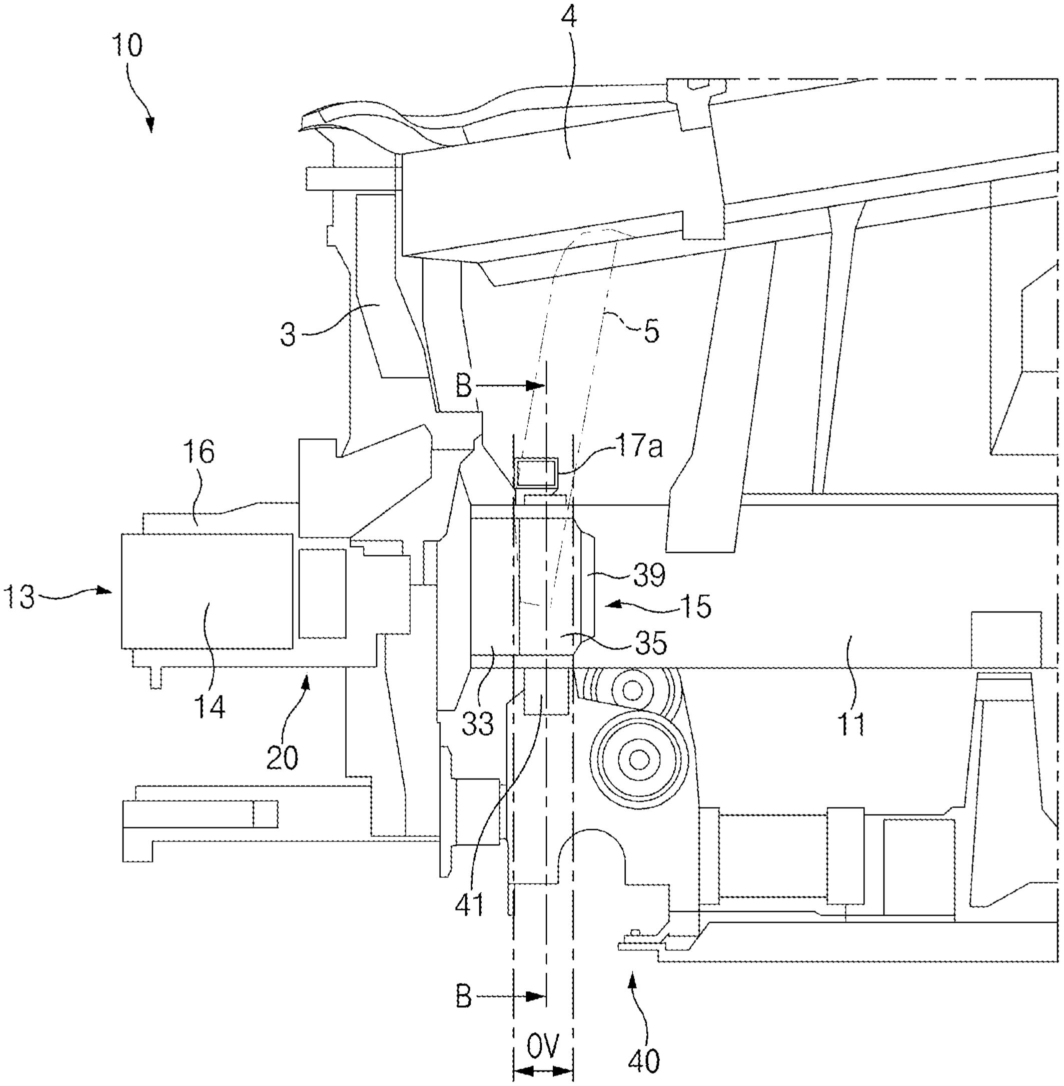
FIG. 5 illustrates a side view of an embodiment, viewed in a direction indicated by arrow A of FIG. 3.
Figure 6:
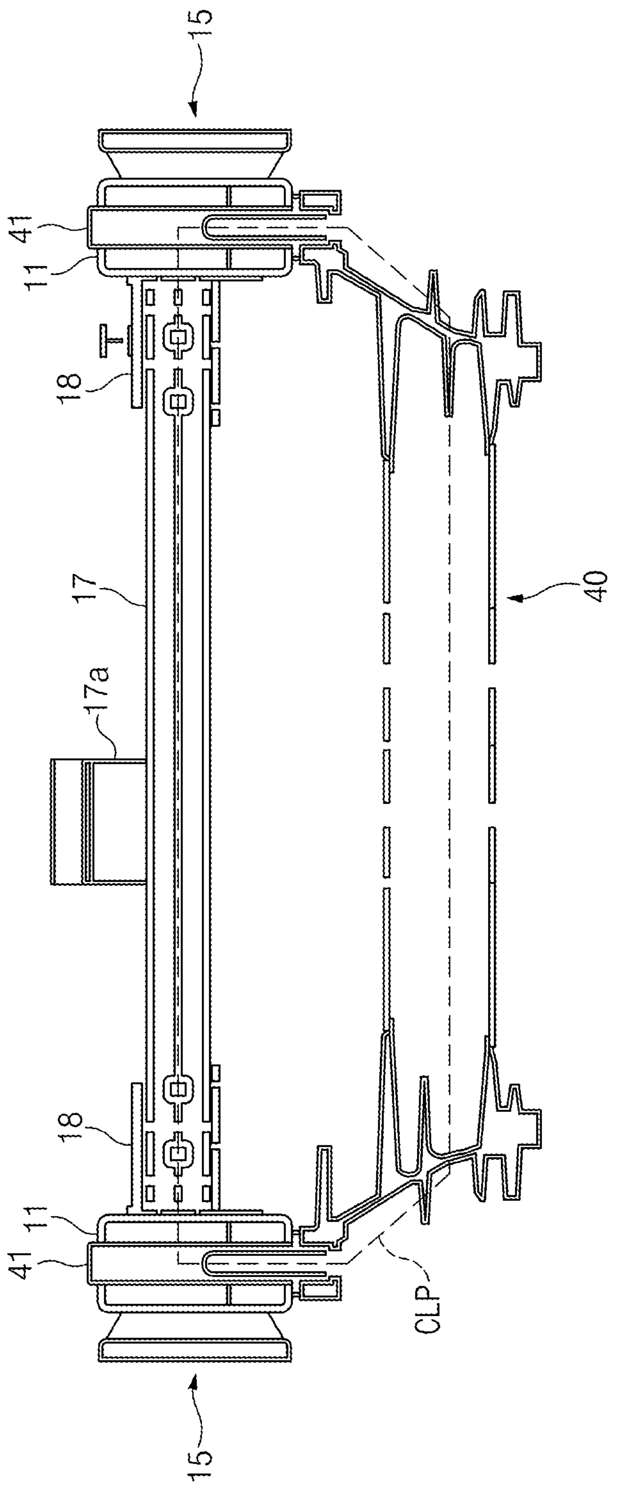
FIG. 6 illustrates a cross-sectional view of an embodiment, taken along line B-B of FIG. 5.

The vehicle front structure 10 according to an exemplary embodiment of the present disclosure may include a front subframe 40 located below the pair of front side members 11, as shown in FIGS. 3-8. The front subframe 40 may be mounted on the front side members 11 and the dash cross-member 1. Referring to FIGS. 5 and 6, the front subframe 40 may have a pair of front mounts 41 provided on front ends thereof, and the front mounts 41 of the front subframe 40 may be mounted on the front side members 11. Each front mount 41 may have a pipe form mounted on the front portion of the front side member 11. The front subframe 40 may be configured to support an electric motor or electric engine, power electronics, a transmission, a suspension, and the like.

Referring to FIGS. 3 and 5, the front mount 41 of the front subframe 40 may be aligned with at least a portion of the corresponding support 15, the bracket 18, and the frunk bar 17 along the width direction of the vehicle. Accordingly, the front mount 41 of the front subframe 40 may be located in the overlap area OV between the support 15 and the frunk bar 17, and thus a load in the event of a vehicle crash may be transferred to the front subframe 40 through the support 15, the front side member 11, and the front mount 41.

Referring to FIG. 6, the front mounts 41 of the front subframe 40 may be directly connected to the pair of front side members 11, and the front mounts 41 may be aligned with the frunk bar 17 in the width direction of the vehicle so that the frunk bar 17, the pair of front mounts 41, and the front subframe 40 may form a closed loop (CLP) structure. As the frunk bar 17, the pair of front mounts 41, and the front subframe 40 form the CLP structure, the lateral force transferred through the support 15, the frunk bar 17, and the front subframe 40 at the beginning of a crash may increase, and thus lateral displacement of the vehicle may increase. Mounting stiffness of the front subframe 40 may be increased so that noise, vibration, and harshness (NVH) performance of the vehicle may be improved.

As described above (see, e.g., FIG. 4), at the beginning of a small overlap crash, as the barrier 70 strikes the bumper beam extension portion 14, the bumper beam extension portion 14 may be bent toward the support 15, and the deflector 20 may come into contact with the first inclined wall 33 of the support 15. Due to such design in an embodiment, with the first inclined wall 33 of the support 15 inclined with respect to the longitudinal axis of the front side member 11 at an acute angle, and with the first attachment wall 31 and the second inclined wall 34 of the support 15 attached to the plate 11*a* of the front side member 11, when the bumper beam extension portion 14 is bent toward the support 15 by the barrier 70 and the deflector 20 strikes the support 15, the bending of the front side member 11 may be relatively reduced, and lateral displacement of the vehicle may be relatively increased. During a small overlap crash using an embodiment of the present disclosure, as the bending of the front side member 11 is minimized and lateral displacement of the vehicle is increased, the vehicle may slide away from the barrier 70 without or with minimized/reduced yaw rotation. Thus, a passenger's head and neck rotation may be minimized/reduced, and passenger safety may be improved by using an embodiment of the present disclosure.

In particular, during a small overlap crash using an embodiment of the present disclosure, lateral displacement of the vehicle may be relatively increased and yaw rotation of the vehicle may be minimized so that a barrier 70 may not directly strike a front pillar of the vehicle adjacent to a front door opening. Accordingly, by using an embodiment of the present disclosure, a front pillar reinforcement system may be relatively simplified, and thus the weight and manufacturing cost of the front pillar may be significantly reduced.

As set forth above, according to exemplary embodiments of the present disclosure, when a vehicle collides with a barrier in a small overlap crash test, yaw rotation of the vehicle may be suppressed and lateral displacement of the vehicle may be increased so that the weight of the reinforcement for a front pillar adjacent to a front door opening may be relatively reduced, having an advantageous effect on passenger safety.

According to exemplary embodiments of the present disclosure, the first deflector member and the second deflector member of the deflector may be joined to the bumper beam extension portion so that assembly of the deflector and the bumper beam extension portion may be significantly improved, and mounting stiffness of the deflector may be increased.

According to exemplary embodiments of the present disclosure, the deflector may be spaced apart from the support in the diagonal direction before the occurrence of a crash, and the deflector may be moved by a distance equal to the amount of space between the deflector and the support, and then strike or come into contact with the support when the bumper beam extension portion is bent during the crash, and thus sufficient low-speed crashworthiness of the vehicle may be achieved.

According to exemplary embodiments of the present disclosure, at least a portion of the support may be aligned with a portion of the front side member, the bracket, and the frunk bar in the width direction of the vehicle so that a portion of the support, a portion of the front side member, the bracket, and the frunk bar may overlap each other. Accordingly, the support, the front side member, the bracket, and the frunk bar may form a load path transferring a lateral force laterally, and thus lateral displacement of the vehicle may increase during a small overlap crash.

Hereinabove, although the present disclosure has been described with reference to exemplary embodiments and the accompanying drawings, the present disclosure is not necessarily limited thereto, but may be variously modified and altered by those skilled in the art to which the present disclosure pertains without departing from the spirit and scope of the present disclosure claimed in the following claims.

What is claimed is:

1. A vehicle front structure, comprising:
- a first front side member;
- a front bumper beam located in front of the first front side member;
- a bumper beam extension portion extending from an end of the front bumper beam;
- a deflector mounted on the bumper beam extension portion; and
- a support located behind the deflector, wherein the support is attached to an outboard surface of the first front side member,
- wherein the deflector comprises:
  - a first deflector member located outside the bumper beam extension portion, and
  - a second deflector member at least partially located in a cavity of the bumper beam extension portion, wherein the first deflector member and the second deflector member are fixed to the bumper beam extension portion.

2. The structure of claim 1, wherein the first deflector member comprises:
- a plurality of interior ribs; and
- a plurality of interior cavities defined by the plurality of interior ribs.

3. The structure of claim 1, wherein the second deflector member comprises:
- a plurality of interior ribs; and
- a plurality of interior cavities defined by the plurality of interior ribs.

4. The structure of claim 1, wherein the second deflector member comprises:
- an insert portion inserted into the cavity of the bumper beam extension portion; and
- a protruding portion protruding from the cavity of the bumper beam extension portion.

5. The structure of claim 1, wherein a front width of a front end of the support is less than a rear width of a rear end of the support.

6. The structure of claim 1, wherein the support comprises:
- a plurality of interior ribs; and
- a plurality of interior cavities defined by the plurality of interior ribs.

7. The structure of claim 1, further comprising:
- a second front side member; and
- a crossmember mechanically coupled between the first front side member and the second front side member along a width direction of a vehicle, wherein a first end of the crossmember is fixed to a first inboard surface of the first front side member via a first bracket, and wherein a second end of the crossmember is fixed to a second inboard surface of the second front side member via a second bracket.

8. The structure of claim 7, wherein at least a portion of the support is aligned with the crossmember in the width direction of the vehicle.

9. The structure of claim 7, further comprising:
- a front subframe; and
- a front mount of the front subframe configured to be attached to the first front side member, such that the front mount is aligned with at least a portion of the support and at least a portion of the crossmember.

10. The structure of claim 7, wherein the support comprises a support rear flange extending toward a rear of the vehicle, wherein the support rear flange is attached to the outboard surface of the first front side member.

11. The structure of claim 10, wherein the first bracket comprises a bracket rear flange extending toward the rear of the vehicle, wherein the bracket rear flange of the first bracket is attached to the first inboard surface of the first front side member.

12. The structure of claim 11, wherein the support rear flange of the support is aligned with the bracket rear flange of the first bracket in the width direction of the vehicle.

13. The structure of claim 12, further comprising a pipe extending through the support rear flange of the support, a portion of the first front side member, and the bracket rear flange of the first bracket.

14. The structure of claim 1, further comprising a crush box,
- wherein the front bumper beam is connected to a front end of the first front side member by the crush box,
- wherein a crush box width of the crush box is greater than a member width of the first front side member, and
- wherein the support is mounted on the outboard surface of the first front side member rearward of the crush box.

15. A vehicle front structure, comprising:
- a first front side member;
- a front bumper beam located in front of the first front side member;
- a bumper beam extension portion extending from an end of the front bumper beam;
- a deflector mounted on the bumper beam extension portion;
- a support located behind the deflector, wherein the support is attached to an outboard surface of the first front side member; and
- a crush box,
- wherein the front bumper beam is connected to a front end of the first front side member by the crush box,
- wherein a crush box width of the crush box is greater than a member width of the first front side member,
- wherein the support is mounted on the outboard surface of the first front side member rearward of the crush box, wherein the first front side member comprises a plate provided on the front end of the first front side member, and wherein the crush box is fixed to the plate of the first front side member.

16. The structure of claim 15, wherein the plate comprises:

an inboard flange contacting a first inboard surface of the first front side member; and an outboard flange contacting the support.

17. A vehicle comprising:

a first front side member extending along a first longitudinal direction of the vehicle;

a crush box;

a front bumper beam located forward of the first front side member, the front bumper beam being mechanically coupled to the first front side member via the crush box;

a bumper beam extension portion extending diagonally rearward and outward from the front bumper beam;

a deflector mechanically coupled to an inboard surface of the bumper beam extension portion; and a support mechanically coupled to an outboard surface of the first front side member, such that the support is diagonally separated from the deflector by a spaced distance, and such that a diagonally-inboard-facing deflector surface of the deflector faces toward a diagonally-outward-facing support surface of the support, wherein the deflector comprises:

a first deflector member located outside the bumper beam extension portion, and a second deflector member at least partially inserted into a cavity of the bumper beam extension portion, wherein the first deflector member and the second deflector member are fixed to the bumper beam extension portion.

18. The vehicle of claim 17, further comprising:

a second front side member extending along a second longitudinal direction of the vehicle; and a crossmember mechanically coupled between the first front side member and the second front side member along a lateral axis in a width direction of the vehicle, wherein a portion of the support is located on the lateral axis of the crossmember.

19. The vehicle of claim 18, further comprising:

a front subframe;

a first front mount of the front subframe mechanically coupled to the first front side member, such that the first front mount is aligned with at least a portion of the support and at least a portion of the crossmember; and a second front mount of the front subframe mechanically coupled to the second front side member, such that a closed loop structure is formed comprising the first front mount, the front subframe, the second front mount, and the crossmember.

20. The vehicle of claim 17, wherein the front bumper beam is connected to a front end of the first front side member by the crush box, wherein a crush box width of the crush box is greater than a member width of the first front side member, and wherein the support is mounted on the outboard surface of the first front side member rearward of the crush box.

* * * * *